United States Patent
Klugman et al.

(10) Patent No.: US 6,502,685 B1
(45) Date of Patent: Jan. 7, 2003

(54) METHOD AND APPARATUS USING VERIFIABLE DATA DESTRUCTION PROCEDURE TO INITIATE REMOVAL OF SUPPLY CHAIN TRANSACTION

(75) Inventors: Elliot David Klugman, Commack, NY (US); Bruce Newman, St. James, NY (US); Michael Polesky, Merrick, NY (US); Michael Blumenthal, Hauppauge, NY (US); Aaron Knoll, Holtsville, NY (US)

(73) Assignee: Protocall Technologies Incorporated, Commack, NY (US)

( * ) Notice: Subject to any disclaimer, the term of this patent is extended or adjusted under 35 U.S.C. 154(b) by 0 days.

(21) Appl. No.: 09/507,986

(22) Filed: Feb. 18, 2000

Related U.S. Application Data

(60) Provisional application No. 60/120,866, filed on Feb. 20, 1999.

(51) Int. Cl.[7] .............................................. G07F 7/00
(52) U.S. Cl. ...................................... 194/208; 194/906
(58) Field of Search ................................ 700/233, 234, 700/235; 194/208, 209, 906; 414/932; 380/231

(56) References Cited

U.S. PATENT DOCUMENTS

| | | | | |
|---|---|---|---|---|
| 4,858,743 A | * | 8/1989 | Paraskevakos et al. | 194/205 |
| 4,896,024 A | * | 1/1990 | Morello et al. | 235/381 |
| 5,909,638 A | * | 6/1999 | Allen | 455/6.1 |

FOREIGN PATENT DOCUMENTS

| | | | |
|---|---|---|---|
| JP | 10-172148 | * | 6/1998 |
| JP | 10-214424 | * | 8/1998 |

OTHER PUBLICATIONS

"The DVD Story Continues To Unfold", Tape–Disc Business, vol. 11, No. 10 p. 2, Oct. 1997.*

* cited by examiner

Primary Examiner—F. J. Bartuska
(74) Attorney, Agent, or Firm—Richard B. Klar

(57) ABSTRACT

A method and system for implementing a secure return policy of supply chain for digitally stored products. The method and system verifies whether each product for return originated within the supply chain. If the product did originate within the supply chain and qualifies for return under the supply chain's return policy, the data existing on the physical media is securely rendered unusable. A record of the destruction allows for a reversal of the entire transaction within the supply chain.

36 Claims, 3 Drawing Sheets

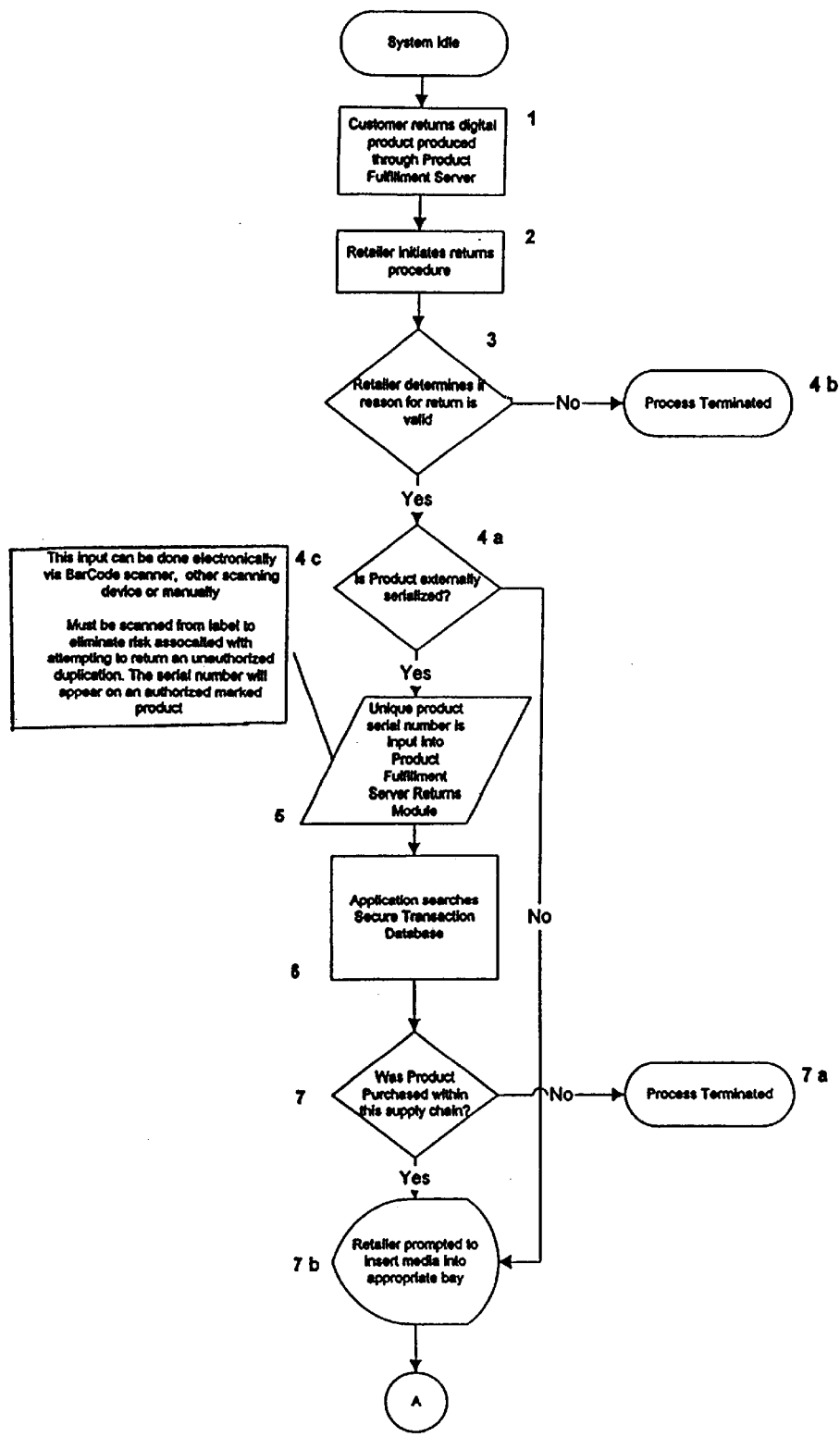
FIG. 1.1

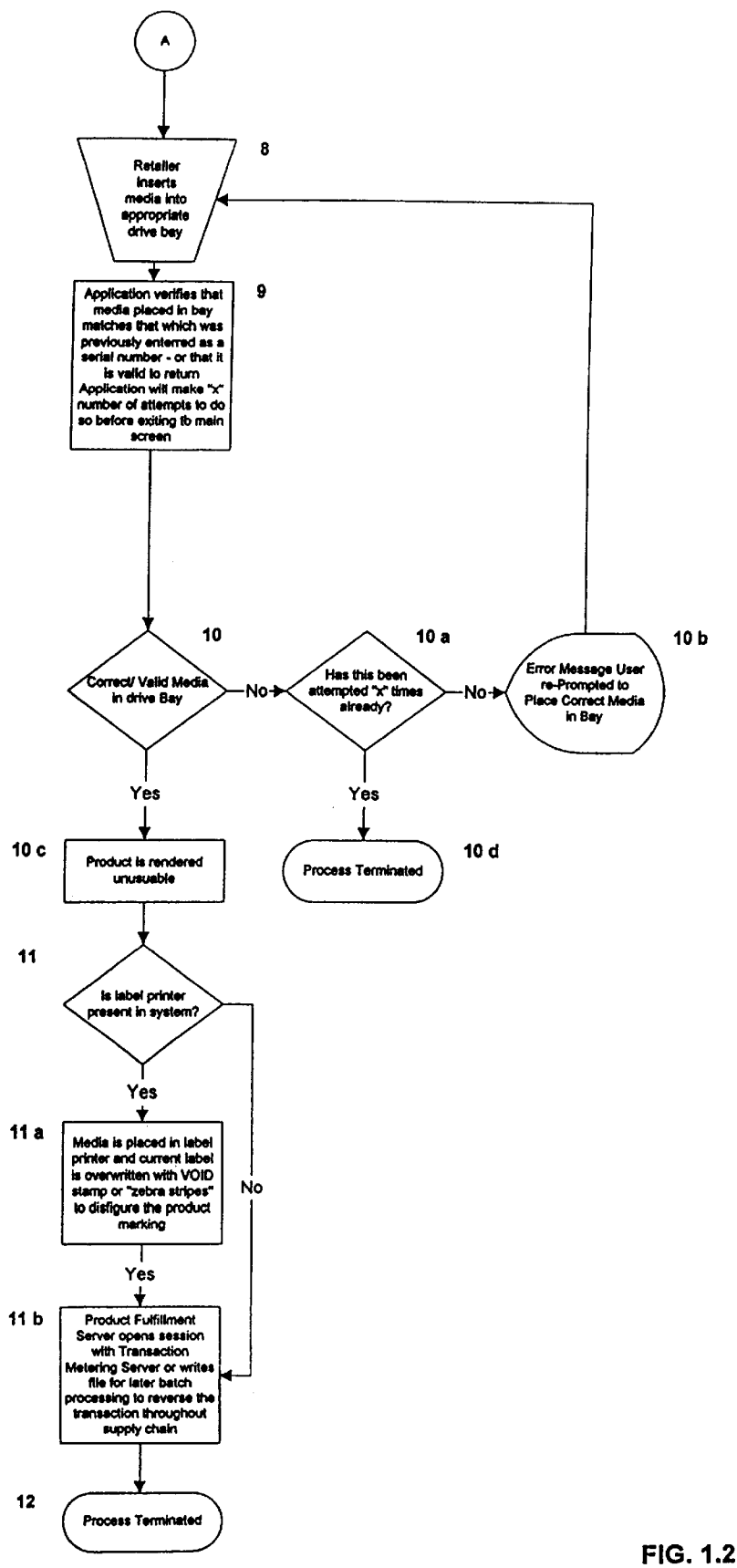
FIG. 1.2

Using a Verifiable Data Destruction Procedure to Initiate the Reversal of Supply Chain Transaction(s)
System Diagram

METHOD AND APPARATUS USING VERIFIABLE DATA DESTRUCTION PROCEDURE TO INITIATE REMOVAL OF SUPPLY CHAIN TRANSACTION

RELATED APPLICATIONS

The present application is a continuation in part of U.S. Provisional patent application Ser. No. 60/120,866 filed on Feb. 20, 1999 and claims priority therefrom.

BACKGROUND OF THE INVENTION

1. Field of the Invention

The present invention relates to a method, apparatus, and system for inventory tracking and destruction of returned digitally stored products to a supply chain having one or more stores. In particular, the present invention relates to a method, an apparatus, and system for electronically handling, confirming, and destroying a digitally stored product such as a Compact Disc, a Digital Versatile Disc or a Digital Audio Tape returned to a supply chain such as a store or chain of stores selling such merchandise.

2. The Prior Art

The prior art discloses various inventory tracking systems. U.S. Pat. No. 5,159,560 to Newell et al. relates the return of rented videocassette. The videocassettes are intended to be reused in further rentals and are not destroyed or marked void.

U.S. Pat. No. 5,523,954 to Weaver et al. discloses a matching system for scanning and sorting documents.

None of the aforementioned prior art inventions discloses or suggests a method and system for implementing a return policy of a supply chain for digitally stored merchandise.

SUMMARY OF THE INVENTION

It is therefore a principal object of the present invention to provide a method and a system for implementing a return policy of a supply chain for digitally stored products in which each product for return can be verified as originating within the supply chain, rendered unusable, and the transaction voided within the supply chain.

It is a further object of the inventon to vary the method of rendering the returned product unusable based on the physical nature of the product being returned.

It is yet another object of the invention to provide a receiving bin in which the product for return is placed and from which the deposited product for return can not be removed until the product is rendered unusable or is determined as not originating from the supply chain.

It is still another object of the invention to identify the product for return as originating from the supply chain and/or the return policy of the product for return by external examination of indicia on the product and/or by internal examination of files in the product.

Other objects in the present invention will become apparent from the foregoing description and the accompanying drawings in which:

BRIEF DESCRIPTION OF THE DRAWINGS

FIG. 1 (encompassing FIG. 1.1 and FIG. 1.2) is a flow chart describing the method and system of the present invention.

DETAILED DESCRIPTION OF THE PREFERRED EMBODIMENTS

Figure 2:
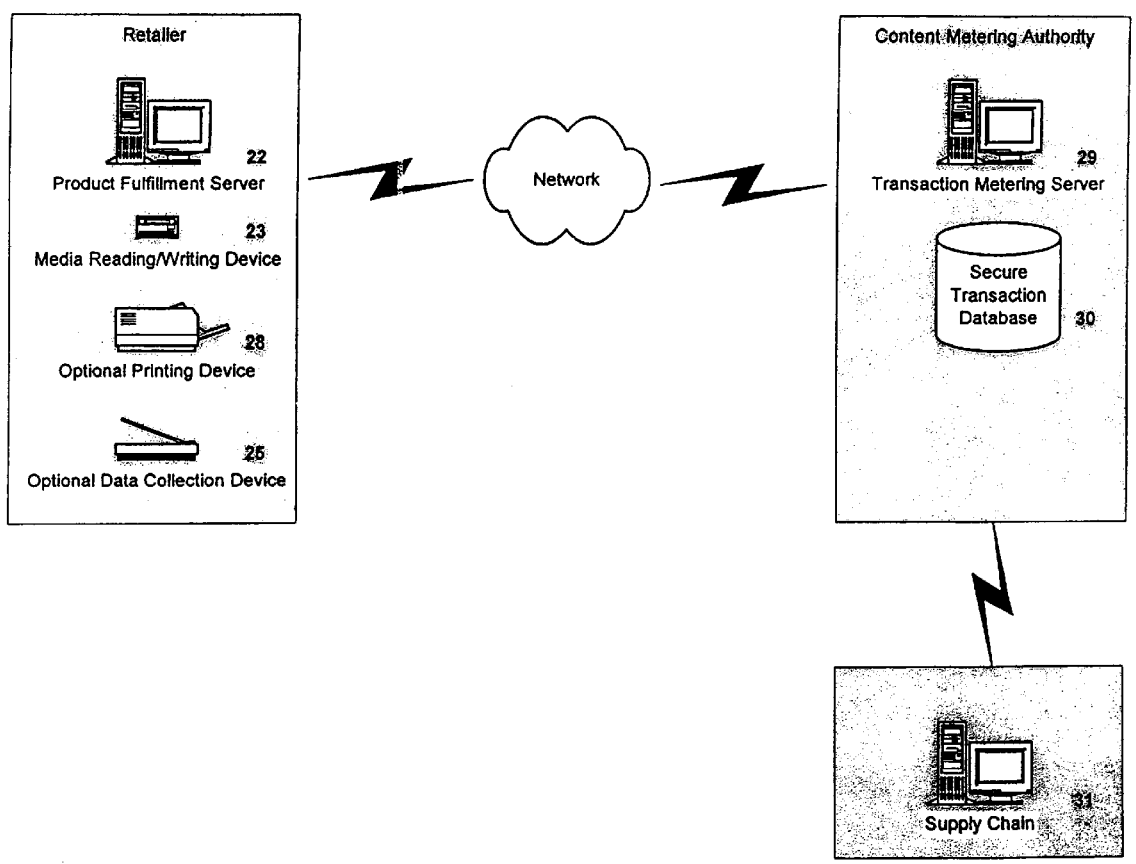
FIG. 2 is an overall block diagram describing the present invention and alternative components therein.

Referring to FIGS. 1 and 2 of the drawings, and in particular to FIG. 1, which is a flow chart of the present invention in which the invention remains idle until a customer decides to return a product. The product is reviewed to determine if this product qualifies for return under the supply chain's return policy (1 of FIG. 1.1). This review can be done manually by the retailer or store clerk by external examination of the product and/or by electronically scanning the external markings by a barcode scanner or other suitable device. If the markings are internal such as a file containing a unique product identifier or a file containing the information addressing the returnability of the product, then the product would be examined after it is placed in the receiving bin or bay (8 of FIG. 1.2) and examined by a media reader or reading device.

The product for return is a digitally stored product and can preferably fall into one of the following three categories:

Category (a): Erasable or non-erasable optical medium, which can be altered by application of a laser such as: Compact Disc Rewriteable (CD-RW), Compact Disc Recordable (CD-R), or Digital Versatile Disc Random Access Memory (DVD-RAM).

Category (b): Non-erasable optical medium such as: Compact Disc Read-Only Memory (CD-ROM) or Digital Versatile Disc Read Only Memory (DVD-ROM).

Category (c): Erasable or non-erasable magnetic medium such as: Digital Audio Tape (DAT) or VHS Video Tape.

The supply chain may be a single store, a number of stores, or a chain of stores. Each store of the supply chain has a Product Fulfillment Server (22 of FIG. 2) shown in FIG. 2 networked to a Transaction Metering Server (29 of FIG. 2) and Secure Transaction Database (30 of FIG.2), a transaction database for the supply chain containing database information associated with the supply chain, for the Content Metering Authority which can be formed as one or more servers and databases used to record and authorize activity with the supply chain. After the returns procedure is initiated (2) the retailer determines if the reason for the return is valid (3 of FIG. 1.1). If it is not valid then the process is terminated (4b of FIG. 1.1). If the return is valid then the product is examined for an external marking for a unique serialized number (4a of FIG. 1.1). This serial number can be inputted into the Product Fulfillment Server by keyboard, by scanning the product's marking by a barcode reader (4c of FIG. 1.1), or by other means such as an Optional Data Collection Device (25 of FIG. 2) such as but not limited to a light pen or a wireless PDA. The Product Fulfillment Server then searches the Secure Transaction Database (30 of FIG.2) with the inputted serial number to determine if the product originated within the supply chain (7 of FIG. 1.1). If the comparison indicates that there is no match within the Secure Transaction Database (30 of FIG. 2) for the serial number, then the process is terminated (7a of FIG. 1.1). If there is a match, then the retailer is prompted to insert the product into the appropriate receiving bin or bay (7b of FIG. 1.1). The appropriate bay will depend on the category product as being in the aforementioned categories "a", "b" and "c" so that the appropriate media is processed by the appropriate media processing equipment such as media reader and writer, etc. In the bay, the product or media is then read by a Media Reading/Writing (23 of FIG. 2) device to verify that the product placed into the bin or bay is the same product identified by the retailer prior to the placement into the bin (9 of FIG. 1.2). Thus verification can be attempted any number of times such as X times, where X can be any integer selectively chosen by the user of the system, thus giving the system several attempts to have the product placed in the correct bin if it is mistakenly placed in the wrong bin where it cannot be read by the correct media reading device.

Once the product is read, the information is retained in the receiving bin for transmission to the Transaction Metering Server following confirmation that the product has been rendered unusable. The product or media is then rendered unusable in a manner consistent with the category of product it is. If it is a category "a" product, namely a Compact Disc Rewriteable (CD-RW), Compact Disc Recordable (CD-R), or Digital Versatile Disc Random Access Memory (DVD-RAM), then the category "a" product is rendered unusable by a medium writer which has a laser for rewriting the product, thus overwriting and changing the data on the product (10c of FIG. 1.2). In addition, a printer (28 of FIG. 2) can then print stripes such as zebra type stripes on the face of the product and a label with the word "voided" printed on the label can be adhesively placed on the face of the product (11a of FIG. 1.2).

If the product is a category "b" product such as a Compact Disc Read-Only Memory (CD-ROM) or Digital Versatile Disc Read Only Memory (DVD-ROM) then it is rendered unusable by physically destroying said product for return. In addition, a printer (28 of FIG. 2) can then print a label with the word "voided" printed on the label, can be adhesively placed in the face of the product (11a of FIG. 1.2).

If the product is a category "c" product such as a Digital Audio Tape (DAT) or VHS Video Tape then the products can be rendered unusable by a magnetic device employing magnetic means to erase all data contained on the product. The label and/or zebra stripes can then be placed on the product (11a of FIG. 1.2).

After the printing step (11a of FIG. 1.2) (or if there is no label printer or zebra stripe printing then the printing step (11a of FIG. 1.2) is bypassed) and the Product Fulfillment Server communicates and transmits to the Transaction Metering Server (29 of FIG. 2) the reversal of the sales transaction of the product returned and now rendered unusable. The Transaction Metering Server then reverses the transaction through the supply chain by entering the return in the Secure Transaction Database (30 of FIG. 2). The process is then terminated (12 of FIG. 1.2).

While presently preferred embodiments have been described for purposes of this disclosure, numerous changes in the arrangement of method steps and apparatus parts can be made by those skilled in the art. Such changes are encompassed within the spirit of the invention as defined by the appended claims.

What is claimed is:

1. A system for returning a digitally stored product and removing said digitally stored product from a supply chain transaction, comprising:
   (a) means for identifying a digitally stored product as originating from a supply chain;
   (b) means for receiving said digitally stored product identified for return including means for confirming said digitally stored product in said means for receiving is said product identified in (a);
   (c) means for voiding a transaction of sale of said product for return from a transaction log of said supply chain; and
   (d) means for rendering said product for return unusable, wherein said product for return is a non-erasable optical medium—and said means for rendering physically destroys said product for return.

2. The system according to claim 1 wherein said means for voiding a transaction includes means for reading sales data from said product for return prior to said means for rendering renders said product for return unusable and said means for voiding which further includes means for transmitting said sales data read by said means for reading to a computer system containing a Secure Transaction Database of said supply chain to void said product for return's sale from said database of said supply chain only after receiving confirmation from said means for rendering that said product for return has been made unusable by said means for rendering.

3. The system according to claim 2 wherein said means for receiving includes a receiving bin and said product for return is released therefrom after said product for return is made unusable by said means for rendering.

4. The system according to claim 3 wherein said means for receiving includes a receiving bin and said product for return is released therefrom after said product for return is determined by said means for confirming as not originating from supply chain.

5. The system according to claim 1 further comprising: means for verifying said digitally stored product qualifies for a return policy of said supply chain.

6. The system according to claim 5 wherein said means for verifying includes inputting a code number on said product for return into a computer system to verify said product against the Secure Transaction Database of products sold in said database.

7. The system according to claim 5 wherein said means for verifying is a barcode scanner scanning a barcode on said product for return.

8. The system according to claim 6 wherein said database includes information as to return policy such as sales date and number of days therefrom for return, product type as being one qualifying for return, a product being sold on sale and not qualifying as a returnable product.

9. The system according to claim 1 wherein said product for return has external indicia thereon and said means for verifying is separate and external from said means for receiving said product.

10. The system according to claim 9 wherein said means for verifying is a barcode reader.

11. The system according to claim 9 wherein said means for verifying is a computer keyboard for inputting indicia on said product for return to said computer's database.

12. The system according to claim 9 wherein said product for return contains indicia identifying said product as originating from said supply chain internally in said product and said means for identifying is said means for verifying and is located inside of said means for receiving.

13. The system according to claim 12 wherein said indicia of product is an identifying said product and said means for verifying is a media reader for reading said file of said product for return.

14. The system according to claim 1 wherein said product for return is an erasable or non-erasable optical medium which can be altered by application of a laser such as one of either a Compact Disc Rewriteable (CD-RW), a Compact Disc Recordable (CD-R), or a Digital Versatile Disc Random Access Memory (DVD-RAM), and said means for rendering is a medium writer including laser means for rewriting said product for return to overwrite and thereby change the data on said product for return.

15. The system according to claim 1 wherein said product for return is an erasable or non-erasable magnetic medium such as a Digital Audio Tape (DAT) or a VHS Video Tape, and said means for rendering is a magnetic device employing magnetic means to erase all data contained on said product for return.

16. The system according to claim 1 wherein said non-erasable optical medium is either a Compact Disc(CD) or a Digital Versatile Disc (DVD 3).

17. The system according to claim 1 wherein said means for rendering further includes a printer printing label marked "Void" for adhesive placement on the product.

18. The system according to claim 1 where in said means for rendering further includes a printer printing zebra type stripe on a face of the product.

19. A method for returning a digitally stored product and removing said digitally stored product from a supply chain transaction, the steps comprising:

(a) identifying a digitally stored product as originating from a supply chain;

(b) receiving said digitally stored product identified for return including means for confirming said digitally stored product in said means for receiving is said product identified in (a);

(c) voiding a transaction of sale of said product for return from a transaction log of said supply chain; and (d) rendering said product for return unusable, wherein said product for return is a non-erasable optical medium and said voiding step includes physically destroying the product.

20. The method according to claim 19 wherein said voiding step includes reading sales data from said product for return prior to said rendering said product for return unusable and said voiding further includes transmitting said sales data read by said reading step to a computer system containing a Secure Transaction Database of said supply chain to void said product for return's sale from said database of said supply chain only after receiving confirmation that said product for return has been made unusable by said rendering step.

21. The method according to claim 20 wherein said product is released from a receiving bin in said receiving step after said product for return is made unusable by said means for rendering.

22. The method according to claim 21 wherein said product is released from said receiving bin after said product for return is determined by said means for confirming as not originating from supply chain.

23. The method according to claim 19 further comprising the step of:

verifying that said digitally stored product qualifies for a return policy of said supply chain.

24. The method according to claim 23 wherein said verifying step includes inputting a code number said product for return into a computer system to verify said product against the Secure Transaction Database (30 of FIG. 2) of products sold in said database.

25. The method according to claim 23 wherein during said verifying step means for verifying is a barcode scanner scanning a barcode on said product for return.

26. The method according to claim 24 wherein said database includes information as to return policy such as sales date and number of days therefrom for return, product type as being one qualifying for return, a product being sold on sale and not qualifying as a returnable product.

27. The methods according to claim 19 wherein said product for return has external indicia thereon and said verifying step is separate and external from said receiving step.

28. The method according to claim 27 wherein during said verifying step means for verifying is a barcode reader.

29. The method according to claim 27 wherein during said verifying step said means for verifying is a computer keyboard for inputting indicia on said product for return to said computer's database.

30. The method according to claim 27 wherein said product for return contains indicia identifying said product as originating from said supply chain internally in said product and during said identifying step said means for identifying is said means for verifying and is located inside of said means for receiving.

31. The method according to claim 30 wherein said indicia of product is an internal file in said product for return file containing data identifying said product and said means for verifying is a media reader for reading said file of said product for return.

32. The method according to claim 19 wherein said product for return is an erasable or non-erasable optical medium which can be altered by application of a laser such as one of either a Compact Disc Rewriteable (CD-RW), a Compact Disc Recordable (CD-R), or a Digital Versatile Disc Random Access Memory (DVD-RAM), and said means for rendering is a medium writer including laser means for rewriting said product for return to overwrite and thereby change the data on said product for return.

33. The method according to claim 19 wherein said product for return is one of either an erasable or non-erasable magnetic medium such as a Digital Audio Tape (DAT) or a VHS Video Tape, and said means for rendering is a magnetic device employing magnetic means to erase all data contained on said product for return.

34. The method according to claim 19 wherein said non-erasable optical medium is either a Compact Disc (CD) or a Digital Versatile Disc (DVD).

35. The method according to claim 19 wherein said voiding step further includes printing a label marked "Void" for adhesive placement on the product.

36. The system according to claim 19 wherein said voiding step further includes zebra type stripe on a face of the product.

* * * * *